Aug. 5, 1952  D. T. GLEASON  2,605,977
AUTOMATIC TAKE-UP REEL
Filed April 1, 1950  3 Sheets-Sheet 1
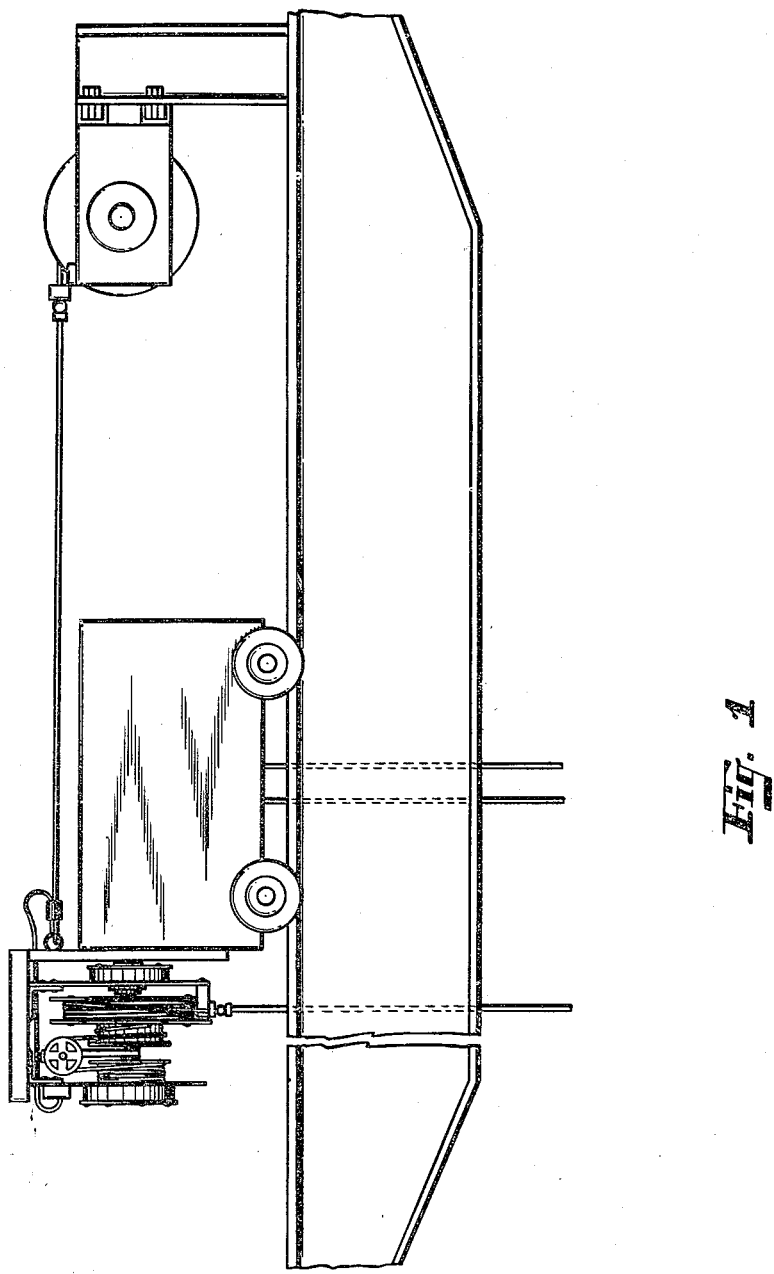

Aug. 5, 1952      D. T. GLEASON      2,605,977
AUTOMATIC TAKE-UP REEL
Filed April 1, 1950      3 Sheets-Sheet 2
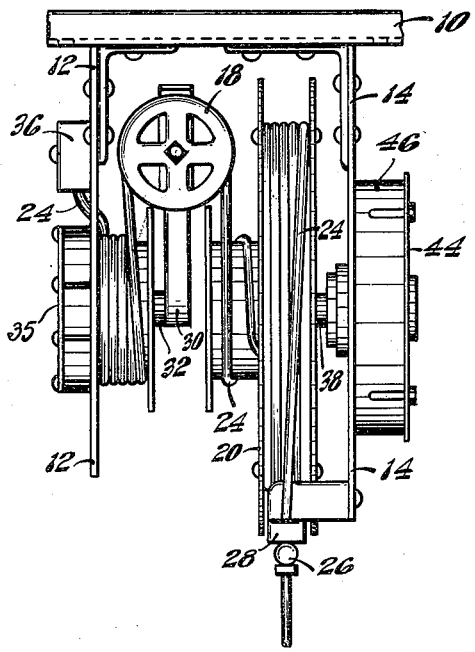
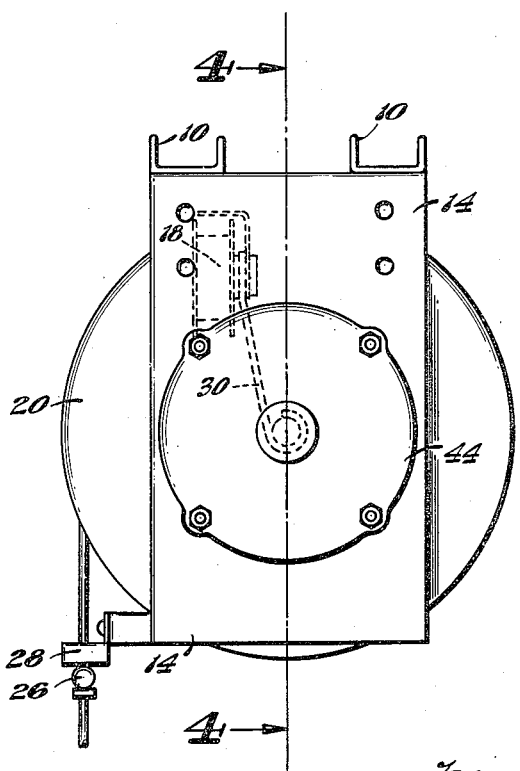

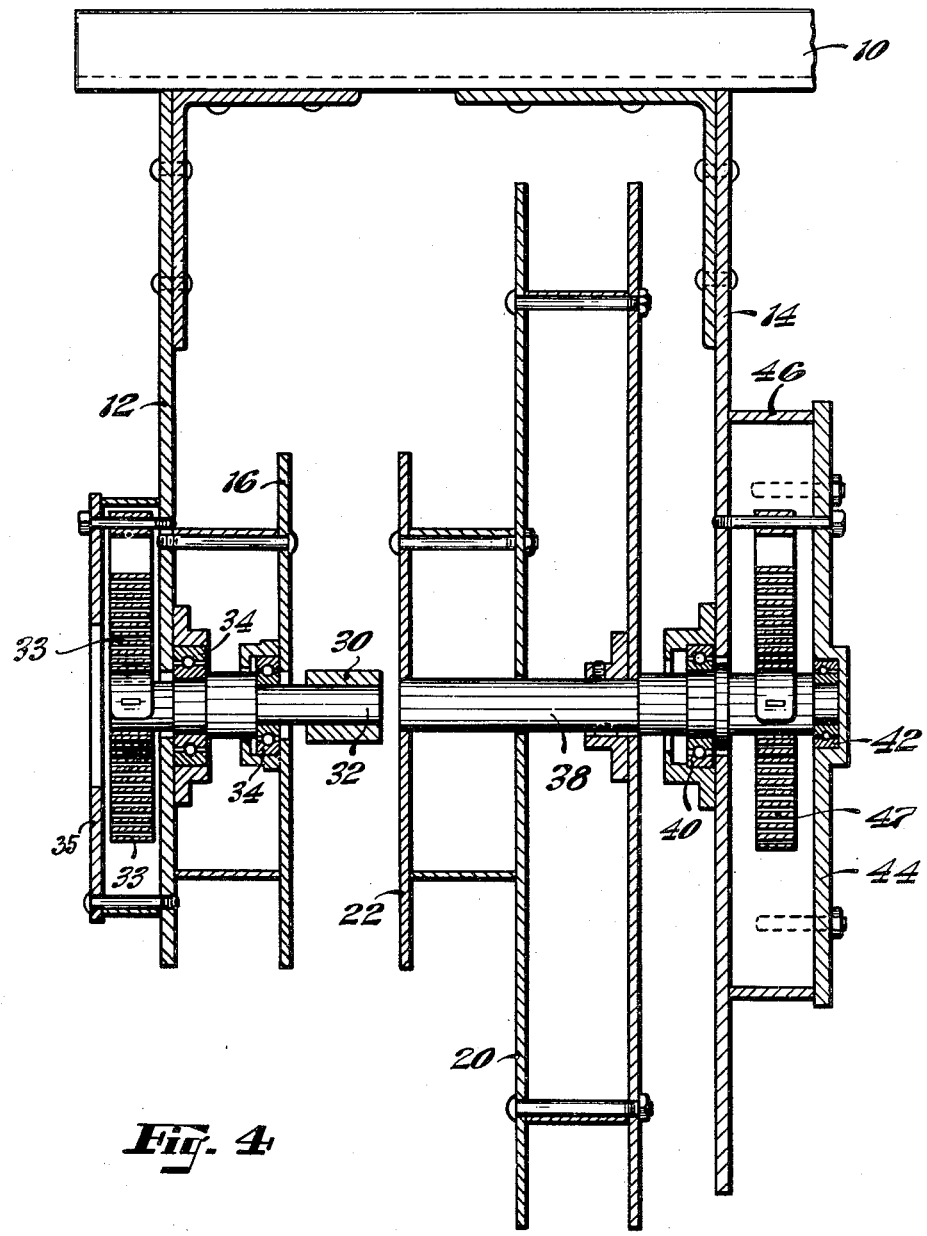

Patented Aug. 5, 1952

2,605,977

UNITED STATES PATENT OFFICE 2,605,977

AUTOMATIC TAKE-UP REEL

Douglas T. Gleason, Lexington, Mass., assignor to J. L. Gleason & Co., Inc., Cambridge, Mass., a corporation of Massachusetts Application April 1, 1950, Serial No. 153,360

5 Claims. (Cl. 242—107)

This invention relates to reels for cables, cords and the like, and more particularly to automatic take-up reels.

In modern industry there is an ever increasing demand for extremely high performance take-up cable reeling. This demand is particularly marked in the field of electronically controlled servo-mechanisms and electronic measuring instruments where mechanical imperfections and random inductance fluctuations caused by imperfect cable winding may drastically disturb the accuracy of performance. One instance where high degree performance is required in cable reeling concerns the use of electronic weighing mechanisms used in bridge crane hoists. The weighing device in these hoists is mounted directly in the lower end of the hoisting attachment and requires flexible cable leads to follow it through its travel up and down. If these leads are either twisted or tensioned substantially beyond the force required for adequate reeling, the electrical characteristics of the cable change sufficiently to interfere with the accuracy of the weighing device.

Conventional take-up reels have been inadequate for the purpose of such high precision reeling as above outlined. Reels have been devised which avoid the undesirable twisting and tensioning, but they have invariably employed slip ring and brush type electrical contacts. Such contacts are inadequate for high precision work because dust and corrosion accumulates on the contacts spoiling the fidelity of the circuit. One type of hitherto known reel avoided slip ring contacts and also avoided twisting the cable, but it had the unavoidable disadvantage of over-tensioning the cable. Of course both over-tensioning and twisting are also undesirable purely for maintenance reasons. Hitherto, however, no automatic take-up reel has been devised which both avoids slip rings and cable twisting, and at the same time operates without tensioning the cable beyond the normal requirement for either horizontal or vertical reeling.

Therefore, it is an object of my invention to provide an automatic take-up reel for cables and the like which does not employ slip rings, which will not twist the cable, and which will perform the reeling operation without tensioning the cable beyond the requirements of normal reeling.

Further objects and features of my invention will best be understood and appreciated from the following detailed description of a preferred embodiment selected for purposes of illustration and shown in the accompanying drawings in which:

Fig. 1 is a view in side elevation of any bridge crane equipped with cable take-up reel of my invention;

Fig. 2 is a view in front elevation of the take-up reel of my invention;

Fig. 3 is a view in side elevation of the same; and

Fig. 4 is a sectional view in front elevation along the lines 4—4 of Fig. 3.

The preferred embodiment of my invention herein shown is mounted on a pair of supporting beams 10 and includes in its general organization a heavy steel plate 12 secured to the beam 10 at one end of the reel and a heavy steel plate 14 similarly secured to the beam 10 at the other end. Plate 12 serves to support a stationary reel 16 and an intermediate winding sheave 18; and plate 14 serves to support an active cable reel 20 and a smaller winding cable reel 22 coaxial with each other and with the stationary reel 16 mounted on plate 12. A cable 24 is mounted on the reels as will be more fully explained.

In Fig. 2 it will be seen that cable 24 is entirely reeled in, and that cable stop 26 near the working end of cable 24 is flush against a socket 28 suitably fixed to plate 14 and adapted to arrest the inward reeling of the cable. In this position cable 24 is wound fully onto the stationary reel 16; the small winding reel 22 is essentially free from cable and the active cable reel 20 is fully wound. It will be understood that cable 24 passes from reel 20 to reel 22 through a perforation (not shown) in the side wall thereof.

It is of primary importance in understanding my invention to note that it comprises two separate units, and that there is no interconnection between the elements supported by plate 12 and those supported by plate 14 other than that provided by the cable 24 itself. The winding sheave 18 is supported laterally by an arm 30 upon a winding shaft 32 concentrically within reel 16. Shaft 32 is mounted for rotation in suitable spaced bearings 34 supported by plate 12 and rotates coaxially with and inside of stationary reel 16. A suitable spring 33 is housed in a drum 35 outward of plate 12 and, being connected to the shaft 32, serves to drive arm 30 around reel 16 carrying the winding sheave 18 with it. Cable 24 enters through a junction box 36 and passes around the stationary reel 16. It will be understood that, while shaft 32 is not supported outward of arm 30, the bearings 34 are sufficiently spaced to provide rigidity of alignment.

The winding reel 22 and active cable reel 20 are mounted on a main drive shaft 38 in axial alignment with shaft 32. Shaft 38 is supported by a suitable inner bearing 40 mounted on plate 14 and an outer bearing 42 mounted on the outer face 44 of a drum 46 likewise mounted on plate 14. Drum 46 houses a drive spring 47 for shaft 38. It will be understood here also that, while shaft 38 is unsupported outward of reel 22, bearings 40 and 42 are adequately spaced to provide alignment rigidity.

The operation of the take-up reel of my invention is as follows. When cable 24 is withdrawn so as to commence turning active cable reel 20, reel 22 being mounted on a shaft 38, also turns and thereby tensions the cable 24 over the winding sheave 18. Since winding sheave 18 is offset, as may be seen in dotted lines in Fig. 3, cable 24 draws it around against the force of spring 33. It will be understood, of course, that the tension of spring 33 only is sufficient to operate arm 30 and does not subject the cable to more tension than is necessary to wind it around reel 22. As the active cable reels out and the winding sheave backs around, cable 24 unwinds from reel 16 and winds up onto reel 22. It will be seen also that during this phase of the operation the spring 47 on shaft 38 is being wound up. When the cable is fully unreeled, springs 33 and 47 are fully wound, reel 16 is empty, reel 22 is fully wound, reel 20 is empty, and the cable is under tension to re-wind it mainly from spring 47 on shaft 38, but also slightly from spring 33 on shaft 32. It will be noted, however, that the cable between the stationary reel 16 and the winding reel 22 is not under the full tension of spring 47 but is only tensioned by the force of spring 33 on shaft 32, and that the maximum tension on the cable is at the active reel 20. It will be seen also that the operation of unreeling, as well as its counterpart of reeling up, entails no twisting of the cable, and that no exposed slip ring contacts are employed.

Minor variations of this preferred embodiment of my invention will be apparent to those skilled in the art. For instance, it will be noted that reels 16 and 22 are smaller in diameter than active reel 20. This feature effects a reduction in the amount of cable necessary for reels 16 and 22. Furthermore, it is within the spirit of this invention to employ a much lighter cable for reels 16 and 20 where they are protected and receive only light tension while employing heavier cable on reel 22, the two types of cable, of course, being suitably connected. Therefore, it is not intended to confine the invention to the precise limits of the illustration herein shown but rather to measure the invention in terms of the appended claims.

Having thus described and disclosed a preferred embodiment of my invention, what I claim as new and desire to secure by Letters Patent of the United States is:

1. A take-up reel having in combination two independently rotatable spring driven shafts positioned end to end in axial alignment, an arm, a winding sheave mounted on said arm, said arm and sheave mounted on and secured to one said shaft, a winding reel, and an active cable reel, said winding and active cable reels mounted on the other said shaft and secured to it for rotation.

2. A take-up reel having in combination two independently rotatable spring driven shafts positioned end to end in axial alignment, a stationary reel mounted concentric with but free from one said shaft, a winding sheave, an arm mounted on and secured to said latter mentioned shaft adjacent to said stationary reel and supporting said winding sheave outward therefrom, a winding reel, and an active cable reel, said winding and active cable reels mounted on the other said shaft and secured to it for rotation.

3. A take-up reel having in combination two independently rotatable spring driven shafts positioned end to end in axial alignment, a stationary reel mounted concentric with but free from one said shaft, a winding sheave, an arm mounted on and secured to said latter mentioned shaft adjacent to said stationary reel and supporting said winding sheave outward therefrom, a winding reel, and an active cable reel, said winding and active cable reels mounted on and secured to the other said shaft with the winding reel adjacent to the shaft end nearest the said arm and winding sheave.

4. A take-up reel comprising a frame, a winding shaft mounted for rotation within said frame, a reel driving shaft mounted for rotation within said frame and in axial alignment with said winding shaft, a stationary reel secured to said frame mounted concentrically with said winding shaft, an arm secured to said winding shaft at its end adjacent the said driving shaft, said arm extending laterally alongside said stationary reel, a winding sheave mounted on and secured to said arm, a winding reel mounted on and secured to said driving shaft at its end adjacent said winding shaft, an active cable reel mounted on said drive shaft, a spring operatively connected to said winding shaft adapted to urge said arm and sheave in rotation when wound up, and a main drive spring operatively connected to said driving shaft adapted to urge said active cable reel in rotation when said spring is wound up.

5. A take-up reel having in combination two independently rotatable shafts positioned end to end in axial alignment, separate means for driving each said shaft in rotation, a stationary reel mounted concentric with but free from one said shaft, a winding sheave, an arm mounted on and secured to said latter mentioned shaft adjacent to said stationary reel and supporting said winding sheave outward therefrom, a winding reel, and an active cable reel, said winding and active cable reels mounted on and secured to the other said shaft with the winding reel adjacent to the shaft end nearest the said arm and winding sheave.

DOUGLAS T. GLEASON.

REFERENCES CITED

The following references are of record in the file of this patent:

UNITED STATES PATENTS

| Number | Name | Date |
| --- | --- | --- |
| 1,322,407 | Chegwidden | Nov. 18, 1919 |